United States Patent
Umezawa et al.

(10) Patent No.: US 9,942,425 B2
(45) Date of Patent: Apr. 10, 2018

(54) IMAGE PROCESSING APPARATUS, INFORMATION PROCESSING APPARATUS, AND MEDIUM THAT SELECTIVELY PROVIDE PROMPTS TO CONFIRM ORIENTATION

(71) Applicants: Asaki Umezawa, Tokyo (JP); Sachiko Fukumaru, Tokyo (JP); Kazuki Sasayama, Kanagawa (JP)

(72) Inventors: Asaki Umezawa, Tokyo (JP); Sachiko Fukumaru, Tokyo (JP); Kazuki Sasayama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 13 days.

(21) Appl. No.: 15/215,185

(22) Filed: Jul. 20, 2016

(65) Prior Publication Data
US 2017/0048399 A1    Feb. 16, 2017

(30) Foreign Application Priority Data
Aug. 10, 2015 (JP) .................................. 2015 158528

(51) Int. Cl.
*H04N 1/00* (2006.01)

(52) U.S. Cl.
CPC ......... *H04N 1/0044* (2013.01); *H04N 1/0097* (2013.01); *H04N 1/00482* (2013.01); *H04N 1/00721* (2013.01); *H04N 1/00771* (2013.01); *H04N 2201/0094* (2013.01)

(58) Field of Classification Search
None
See application file for complete search history.

(56) References Cited

U.S. PATENT DOCUMENTS

| | | |
|---|---|---|
| 9,041,944 B2 | 5/2015 | Umezawa et al. |
| 9,256,459 B2 | 2/2016 | Sasaki et al. |
| 9,294,638 B2 | 3/2016 | Umezawa et al. |
| 2012/0062941 A1 | 3/2012 | Sasayama |
| 2013/0074008 A1 | 3/2013 | Umezawa et al. |
| 2013/0163019 A1* | 6/2013 | Tago .................. H04N 1/00442 358/1.13 |
| 2015/0339548 A1 | 11/2015 | Kitayama et al. |
| 2016/0072977 A1 | 3/2016 | Sasayama et al. |

FOREIGN PATENT DOCUMENTS

| | | |
|---|---|---|
| JP | 4858885 | 1/2012 |
| JP | 2014-097859 | 5/2014 |

* cited by examiner

*Primary Examiner* — Andrew H Lam
(74) *Attorney, Agent, or Firm* — Duft Bornsen & Fettig LLP (57) ABSTRACT

An image processing apparatus is to execute a process selected among multiple processes. The image processing apparatus includes a storage unit to store a list in which each of the processes is associated with a type of the process representing whether the process is to use information about an orientation of a document; an objective process determination unit to determine whether the selected process to be executed is of the type to use the information about the orientation of the document, based on the list stored in the storage unit; and a display control unit to display a confirmation screen on a display unit, for prompting to confirm the orientation of the document after having received an execution command for the process, in a case where the process has been determined as of the type to use the information about the orientation of the document.

9 Claims, 9 Drawing Sheets

| PROCESS TYPE | INFORMATION TO BE DISPLAYED |
|---|---|
| FULL-COLOR COPY | N/A |
| VARIABLE SIZE PRINT | N/A |
| DOUBLE-SIDE PRINT | A |
| SORT | N/A |
| AGGREGATED PRINT | A |
| DIVIDED PRINT | A |
| STAPLE | A |
| PUNCH | A |

IMAGE PROCESSING APPARATUS, INFORMATION PROCESSING APPARATUS, AND MEDIUM THAT SELECTIVELY PROVIDE PROMPTS TO CONFIRM ORIENTATION

CROSS-REFERENCE TO RELATED APPLICATIONS

The present application claims the benefit of priority under 35 U.S.C. § 119 of Japanese Patent Application No. 2015-158528, filed on Aug. 10, 2015, the contents of which are incorporated herein by reference in their entirety.

BACKGROUND OF THE INVENTION

1. Field of the Invention

The present disclosure relates to an image processing apparatus, an information processing apparatus, and a medium.

2. Description of the Related Art

When using a conventional image processing apparatus or the like, a user sets the orientation of a document on an automatic document feeder (ADF), a contact glass, or the like, and places the document in the set orientation so that a process is executed on a print side as intended by the user.

A process that needs to have the orientation of a document set on a conventional image processing apparatus may be, for example, a double-side print process, an aggregated print process, a staple process, and the like.

If a user does not recognize that a process needs to have the orientation of a document set on a conventional image processing apparatus, the user may set the document in a wrong orientation, and a processed result not intended by the user may be output if the process is executed.

SUMMARY OF THE INVENTION

According to the disclosed technology, an image processing apparatus is configured to be capable of executing a plurality of processes, and to execute a process selected among the processes. The image processing apparatus includes a storage unit configured to store a list in which each of the processes is associated with a type of the process representing whether the process is to use information about an orientation of a document; an objective process determination unit configured to determine whether the selected process to be executed is of the type to use the information about the orientation of the document, based on the list stored in the storage unit; and a display control unit configured to display a confirmation screen on a display unit, for prompting to confirm the orientation of the document after having received an execution command for the process, in a case where the process has been determined as of the type to use the information about the orientation of the document.

DETAILED DESCRIPTION OF THE EMBODIMENTS

In the following, embodiments will be described with reference to the drawings.

According to an embodiment, it is possible to prevent a processed result not intended by the user from being output. In an embodiment, when an execution command has been issued for a process that needs to have the orientation of a document set, a confirmation screen to prompt confirmation of the orientation of the document is displayed.

Figure 1:
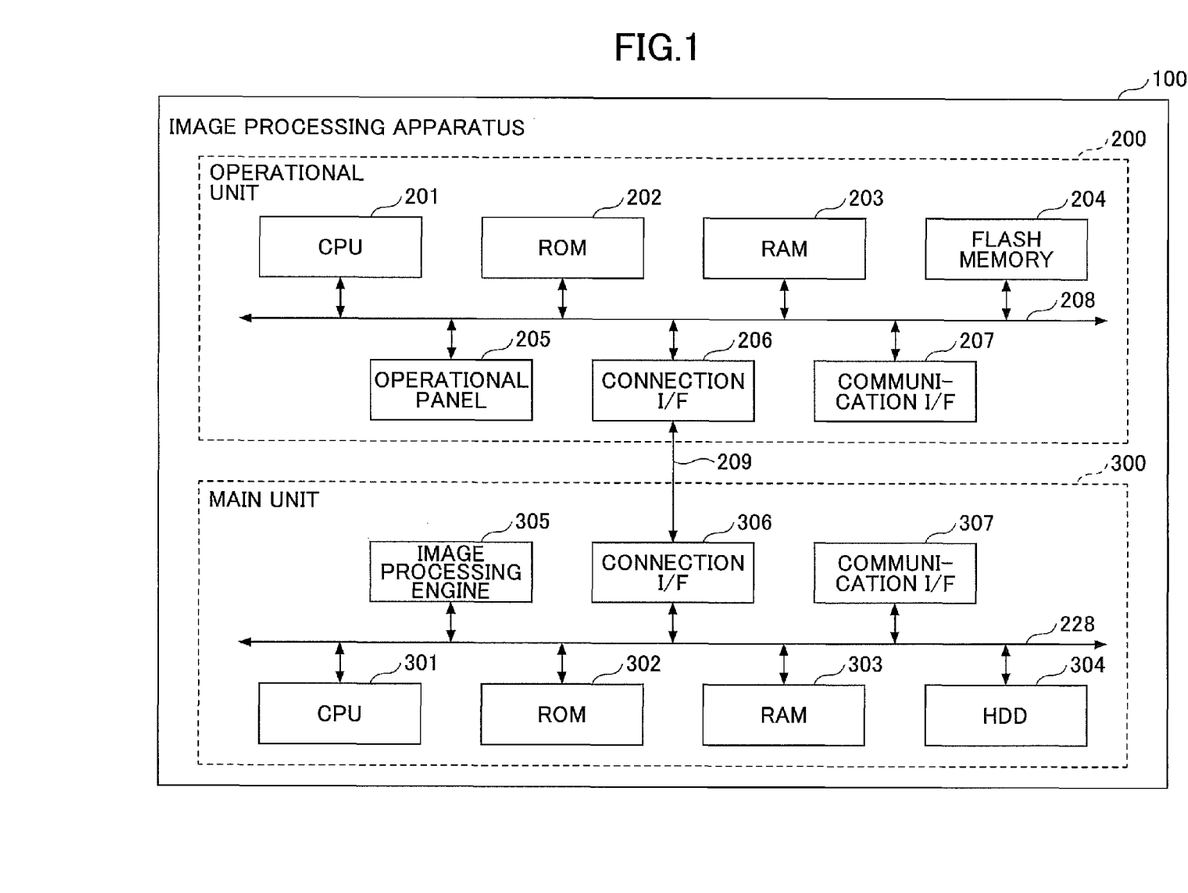
FIG. 1 is a diagram illustrating an example of a hardware configuration of an image processing apparatus.

FIG. 1 is a diagram illustrating an example of a hardware configuration of an image processing apparatus 100.

The image processing apparatus 100 in the embodiment is a multifunction peripheral (MFP) or the like that includes image processing functions, for example, a copy function, a scan function, a facsimile (FAX) function, and a print function.

As illustrated in FIG. 1, the image processing apparatus 100 includes an operational unit 200 and a main unit 300.

The operational unit 200 is used when a user performs various operations such as selecting an image processing function to be executed by the main unit 300; inputting various setting values to execute the image processing function; inputting an execution command to start executing the image processing function; and switching a display screen.

The main unit 300 executes various processes such as execution of an image processing function in response to various operations by the user on the operational unit 200. Also, the main unit 300 requests the operational unit 200 to display various messages.

The operational unit 200 in the embodiment includes a central processing unit (CPU) 201, a read-only memory (ROM) 202, and a random access memory (RAM) 203. The operational unit 200 also includes a flash memory 204, an operational panel 205, a connection interface (I/F) 206, and a communication I/F 207. These hardware units are mutually connected via a bus 208.

The CPU 201 is a processor that executes various programs stored in the ROM 202 or the flash memory 204 by using the RAM 203 as a work area, to control the entire operational unit 200.

The ROM 202 is a non-volatile semiconductor memory (a storage device) that holds data even when power is turned off. The RAM 203 is a volatile semiconductor memory (a storage device) that temporarily stores programs and data.

The flash memory 204 is a non-volatile recording medium to store various programs (for example, programs to implement the embodiment) executed by the CPU 201, and various data items.

The operational panel 205 is used by the user when performing various operations. Also, the operational panel 205 displays various messages. In other words, the operational panel 205 displays, for example, graphical user interface (GUI) display screens for the user to perform various operations with respect to various functions of the image processing apparatus 100, and information about processed results by the image processing apparatus 100 and the like (error messages, guidance messages, etc.).

The connection I/F 206 is an interface to communicate with the main unit 300 via a communication path 209. An interface compliant with, for example, Universal Serial Bus (USB) standards, may be used for the connection I/F 206.

The communication I/F 207 is an interface to communicate with other devices. An interface compliant with, for example, Wi-Fi standards, may be used for the communication I/F 207.

The main unit 300 in the embodiment includes a CPU 301, a ROM 302, and a RAM 303. The main unit 300 also includes a hard disk drive (HDD) 304, an image processing engine 305, a connection I/F 306, and a communication I/F 307. These hardware units are mutually connected via a bus 228.

The CPU 301 is a processor that executes various programs stored in the ROM 302 or the flash memory 304 by using the RAM 303 as a work area, to control the entire main unit 300.

The ROM 302 is a non-volatile semiconductor memory (a storage device) that holds data even when power is turned off. The RAM 303 is a volatile semiconductor memory (a storage device) that temporarily stores programs and data.

The HDD 304 is a non-volatile recording medium to store various programs (for example, programs to implement the embodiment) executed by the CPU 301, and various data items.

The image processing engine 305 is hardware to execute image processing to implement various image processing functions such as a copy function, a scan function, a FAX function, and a print function.

The image processing engine 305 may include, for example, a scanner that optically captures a document to generate image data, a plotter that executes printing on a sheet member such as a sheet, and a FAX communication device that executes FAX communication. The image processing engine 305 may also include, for example, a finisher that sorts out printed sheet members, and an ADF that feeds documents automatically.

The connection I/F 306 is an interface to communicate with the operational unit 200 via the communication path 209. An interface compliant with, for example, USB standards, may be used for the connection I/F 306.

The communication I/F 307 is an interface to communicate with other devices. An interface compliant with, for example, Wi-Fi standards, may be used for the communication I/F 307.

By having the above hardware configuration, the image processing apparatus 100 in the embodiment can implement various processes, as will be described later.

Note that in FIG. 1, although an example of a configuration is illustrated in which the image processing apparatus 100 includes the operational unit 200, the configuration is not limited as such. For example, the operational unit 200 may be an information processing terminal such as a tablet terminal, a smart phone, a cellular phone, and a PDA. In other words, these information processing terminals may communicate with the image processing apparatus 100 via the communication I/F 207 of the operational unit 200 or the communication I/F 307 of the main unit 300, to be capable of controlling the image processing apparatus 100.

Figure 2:
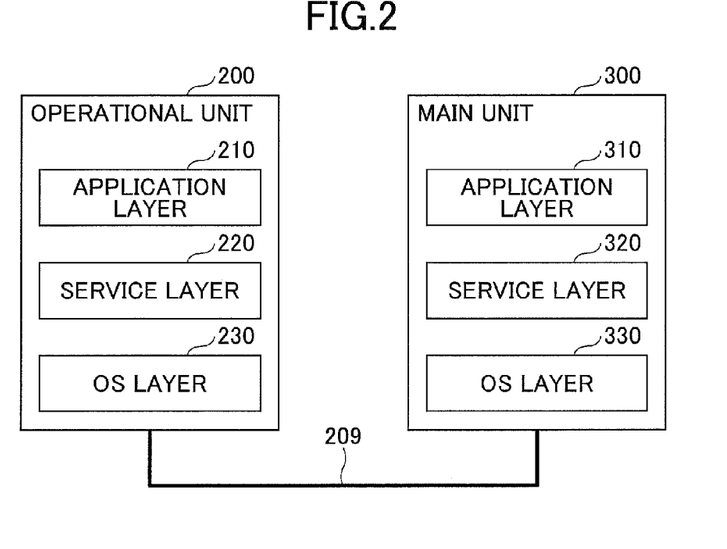
FIG. 2 is a diagram illustrating an example of a hierarchical structure of a group of programs included in an operational unit and a main unit of an image processing apparatus.

Next, a hierarchical structure of a group of programs included in the operational unit 200 and the main unit 300 of the image processing apparatus 100 will be described with reference to FIG. 2. FIG. 2 is a diagram illustrating an example of a hierarchical structure of a group of programs included in the operational unit 200 and the main unit 300 of the image processing apparatus 100.

FIG. 2 illustrates the hierarchical structure of a group of programs included in the operational unit 200, and a group of programs included in the main unit 300.

The group of programs included in the operational unit 200 are stored in the ROM 202, the flash memory 204, and the like. The group of programs included in the main unit 300 are stored in the ROM 302, the HDD 304, and the like.

First, the hierarchical structure of the group of programs included in the main unit 300 will be described. The group of programs included in the main unit 300 may be generally classified into an application layer 310, a service layer 320, and an operating system (OS) layer 330.

A program classified into the application layer 310 is a program that operates on a hardware resource(s) to implement an image processing function. Specifically, a copy application, a scan application, a FAX application, and a print application may be considered.

A program classified into the service layer 320 is a program that lies between the application layer 310 and the OS layer 330. Such a program plays a role as an interface through which a program in the application layer 310 uses hardware resources included in the main unit 300, and states of the hardware resources included in the main unit 300 are indicated.

Specifically, a service-layer program may receive operational requests for the hardware resources, and may arbitrate the received operational requests. Also, a service-layer program may transmit an error detected in a hardware resource as error information. Note that operational requests received by the service layer 320 include, for example, operational requests for image processing by the image processing engine 305 (an operational request for capturing by a scanner, an operational request for printing by a plotter, and the like).

Note that the role of the interface executed by a program classified into the service layer 320 is also served for the application layer 210 of the operational unit 200. In other words, a program classified into the application layer 210 of the operational unit 200 accesses the service layer 320, to operate on the hardware resources of the main unit 300 so as to realize the image processing functions.

A program classified into the OS layer 330 is a program called basic software that provides basic functions to control the hardware resources included in the main unit 300. A program classified into the OS layer 330 receives an operational request for a hardware resource from a program classified into the application layer 310 via a program classified into the service layer 320, and executes processing in response to the operational request. Also, after a program classified into the OS layer 330 has started running, the program may receive an error detected in a hardware resource, and transfers the error information to the service layer 320.

Next, the hierarchical structure of a group of programs included in the operational unit 200 will be described. Similar to the main unit 300, the group of programs included in the operational unit 200 may be generally classified into an application layer 210, a service layer 220, and an OS layer 230.

However, functions provided by programs classified into the application layer 210, and types of operational requests that can be received by the service layer 220, are different from those of the main unit 300. Programs classified into the application layer 210 of the operational unit 200 mainly provide user interface functions for various operations and displaying.

Note that it is assumed in the embodiment that the operational unit 200 and the main unit 300 have respective OSes that operate independently. Also, as long as the operational unit 200 and the main unit 300 can communicate with each other, the OSes do not need to be the same type. It is possible, for example, that the operational unit 200 uses Android (trademark) as the OS whereas the main unit 300 uses Linux (trademark) as the OS.

In this way, the image processing apparatus 100 may be controlled by different OSes in the operational unit 200 and the main unit 300, respectively. Therefore, communication between the operational unit 200 and the main unit 300 is not executed as inter-process communication in a single apparatus, but executed as communication between different information processing apparatuses. For example, an operation to transmit operational information that represents various operations received by the operational unit 200 from the user to the main unit 300, and an operation to transmit a display request by which the main unit 300 sends a command to the operational unit 200 to display a display screen, correspond to such communication.

However, the image processing apparatus 100 in the embodiment is not limited to have the operational unit 200 and the main unit 300 run different types of OSes, but the operational unit 200 and the main unit 300 may run the same type OS. Also, the image processing apparatus 100 in the embodiment is not limited to have the operational unit 200 and the main unit 300 run respective OSes independently, but the operational unit 200 and the main unit 300 may have a single OS run.

Note that in FIG. 1 and FIG. 2, although it is assumed that the image processing apparatus 100 is configured to include the operational unit 200 and the main unit 300, the configuration is not limited as such. The image processing apparatus 100 in the embodiment may have, for example, the main unit 300 that includes the operational unit 200. In this case, the main unit 300 has the operational panel 205 disposed.

Figure 3:
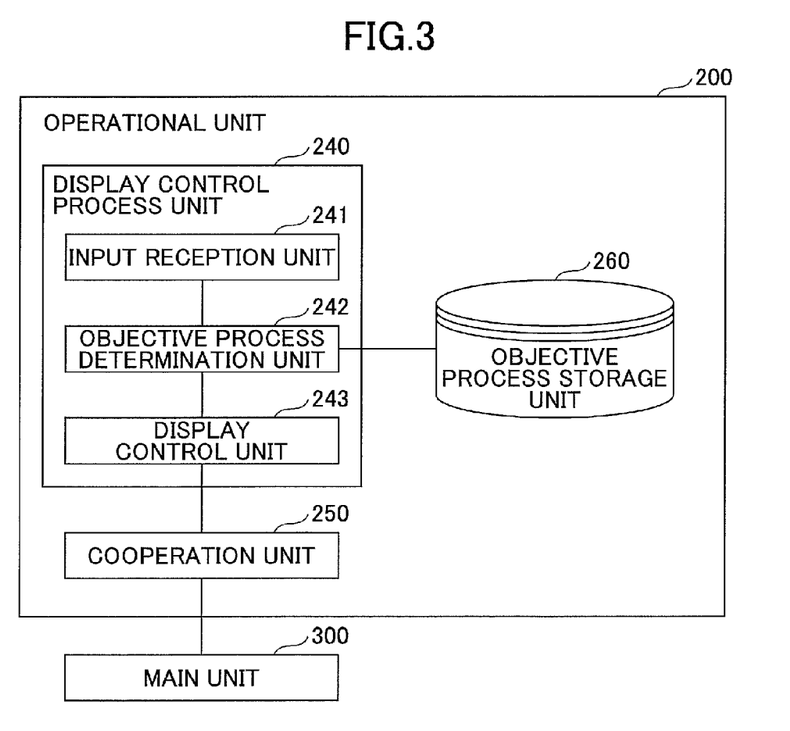
FIG. 3 is a diagram illustrating functional units of an operational unit.

Next, functions of the operational unit 200 in the embodiment will be described with reference to FIG. 3. FIG. 3 is a diagram illustrating functional units of the operational unit 200. Note that these functional units of the operational unit 200 are implemented by the CPU 201 executing programs classified into the application layer 210.

The operational unit 200 in the embodiment includes a display control process unit 240, a cooperation unit 250, and an objective process storage unit 260.

Based on an operation received by the operational unit 200, the display control process unit 240 in the embodiment has the operational panel 205 display a confirmation screen that prompts the user to confirm the orientation of a document that has been set. The display control process unit 240 will be described in detail later.

The cooperation unit 250 in the embodiment transmits a request for executing an image processing function to the main unit 300, and receives from the main unit 300 a request for displaying a message, such as an error message and a guidance message, on the operational panel 205.

The objective process storage unit 260 stores a list in which each process type executed by the image processing apparatus 100, is associated with information representing whether a confirmation screen is to be displayed for the process. It is assumed in the embodiment that processes for each of which a confirmation screen is displayed are determined in advance.

In the embodiment, a process for which a confirmation screen is displayed is a process that needs to have the orientation of a document set to be executed appropriately. In other words, the process for which a confirmation screen is displayed is a process to be executed by using information about the orientation of the document set on the operational unit 200.

Figure 4:
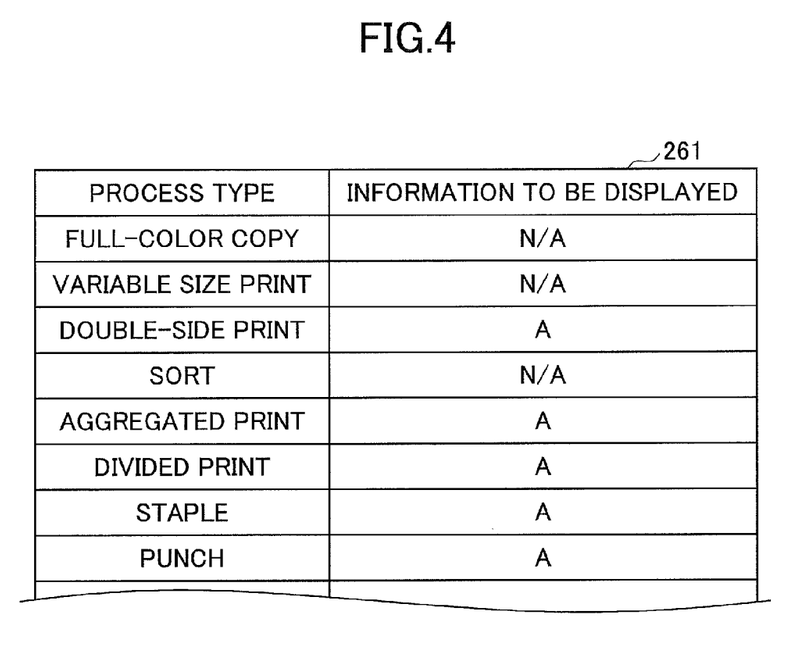
FIG. 4 is a diagram illustrating a list stored in an objective process storage unit.

In the following, the list stored in the objective process storage unit 260 will be described with reference to FIG. 4. FIG. 4 is a diagram illustrating the list stored in the objective process storage unit 260.

In the list 261 stored in the objective process storage unit 260 in the embodiment, the type of each process is associated with information that represents whether a confirmation screen is to be displayed for the process (referred to as "information about confirmation display", below). In other words, each of the multiple processes in the list 261 has an information item associated that represents whether a confirmation screen is to be displayed for the process.

The types of processes may include, for example, all types of processes that are executed on the image processing apparatus 100, or may just include types of copy processes.

In FIG. 4, the type of a process "full-color copy" has the information about confirmation display associated, which is "N/A (non-applicable)". Therefore, it can be seen that the process "full-color copy" is not of the type for which a confirmation screen is to be displayed.

In contract to the above, the type of a process "double-side print" has the information about confirmation display associated, which is "A (applicable)". Therefore, it can be seen that the process "double-side print" is of the type for which a confirmation screen is to be displayed.

Note that in the example in FIG. 4, information about confirmation display is denoted by "A" for a process for which a confirmation screen is to be displayed, and by "N/A" for a process for which a confirmation screen is not to be displayed, but the denotation is not limited as such. Information about confirmation display may be denoted by "Yes" for a process for which a confirmation screen is to be displayed, and by "No" for a process for which a confirmation screen is not to be displayed. The information about confirmation is just required for determining whether a confirmation screen is to be displayed for a corresponding process.

Note that processes for which respective confirmation screens are displayed may include a bookbind process, a two-page-spread, double-side print process, and an enlarged multi-sheet print process, in addition to processes "double-side print", "aggregated print", "divided print", "staple", and "punch" in FIG. 4.

In the following, the display control process unit 240 will be further described. The display control process unit 240 in the embodiment includes an input reception unit 241, an objective process determination unit 242, and a display control unit 243.

The input reception unit 241 in the embodiment receives input on the operational panel 205. The objective process determination unit 242 refers to the objective process storage unit 260, and determines whether a process that corresponds to an operation received by the input reception unit 241 is a process for which a confirmation screen is displayed.

Depending on a determination result by the objective process determination unit 242, the display control unit 243 may display a confirmation screen before executing a command that corresponds to the operation.

Figure 5:
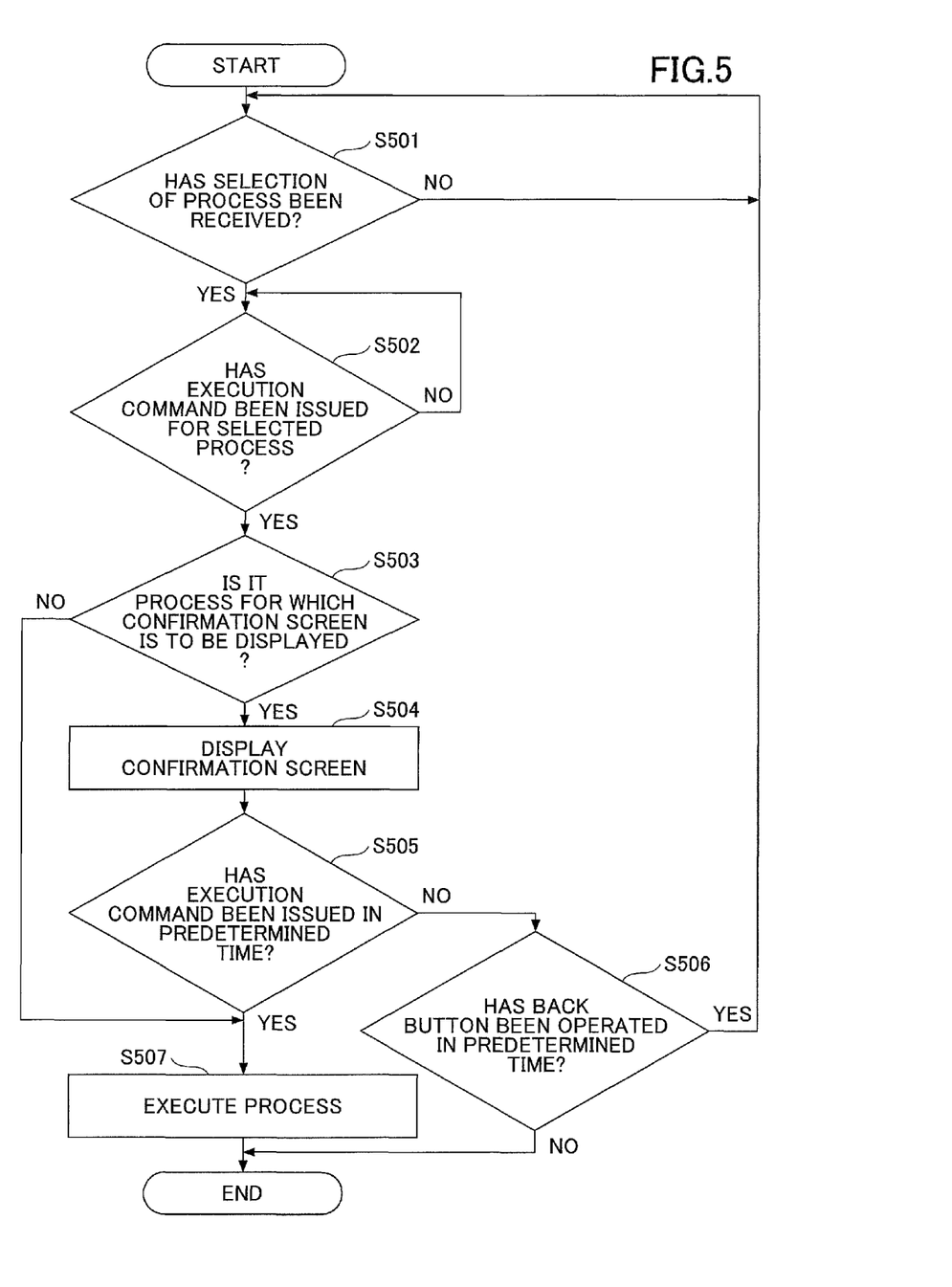
FIG. 5 is a flowchart illustrating operations of an operational unit.

In the following, operations of the operational unit 200 in the embodiment will be described with reference to FIG. 5. FIG. 5 is a flowchart illustrating operations of the operational unit 200.

The operational unit 200 in the embodiment determines whether an operation to select a process to be executed has been received on the operational panel 205 by the input reception unit 241 of the display control process unit 240 (Step S501). Note that display on the operational panel 205 in the embodiment will be described in detail later. At Step S501, if a selection operation has not been received, the input reception unit 241 waits until a selection operation is received.

At Step S501, if a selection operation has been received, the display control process unit 240 determines whether an operation of an execution command for the selected process has been received by the input reception unit 241 (Step S502).

At Step S502, if an execution command has not been received, the input reception unit 241 waits until an execution command is received. Note that in the embodiment, embodiment, if an execution command is not received within a predetermined time, the display control process unit 240 may switch the display on the operational panel 205 from a screen that has been displayed at Step S501 for selecting a process, to a home screen.

At Step S502, if an execution command has been received, the display control process unit 240 has the objective process determination unit 242 refer to the objective process storage unit 260, to determine whether the process for which the execution command has been received is a process for which a confirmation screen is to be displayed (Step S503).

At Step S503, if the process is not a process for which a confirmation screen is to be displayed, the operational unit 200 goes forward to Step S507, which will be described later.

At Step S503, if the process is a process for which a confirmation screen is to be displayed, the display control process unit 240 has the display control unit 243 display a confirmation screen for prompting the user to confirm the orientation of the document to be set (Step S504). Note that the confirmation screen will be described in detail later.

Next, the display control process unit 240 has the input reception unit 241 determine whether an execution command is issued for the process on the confirmation screen within a predetermined time (Step S505).

At Step S505, if an execution command has not been issued within a predetermined time, the display control process unit 240 has the input reception unit 241 determine whether an operation to return to the previous screen has been made on the confirmation screen within a predetermined time (Step S506).

At Step S506, if a corresponding operation has not been made within a predetermined time, the display control process unit 240 ends the process. Note that in this case, the process selected at Step S501 is not executed. Also, the display control process unit 240 may switch the display on the operational panel 205 from the confirmation screen to the screen displayed at Step S501 for selecting a process, or a home screen.

At Step S506, if a corresponding operation has been made within the predetermined time, the display control process unit 240 goes back to Step S501.

At Step S505, if an execution command has been issued for the process, the display control process unit 240 requests the cooperation unit 250 to transmit the execution command to the main unit 300. In response to the request, the cooperation unit 250 transmits a request for executing the process to the main unit 300, and ends the process of this flowchart (Step S507).

In the following, transition of screens on the operational unit 200 in the embodiment will be described with reference to FIGS. 6A-6D and 7.

Figure 6A:
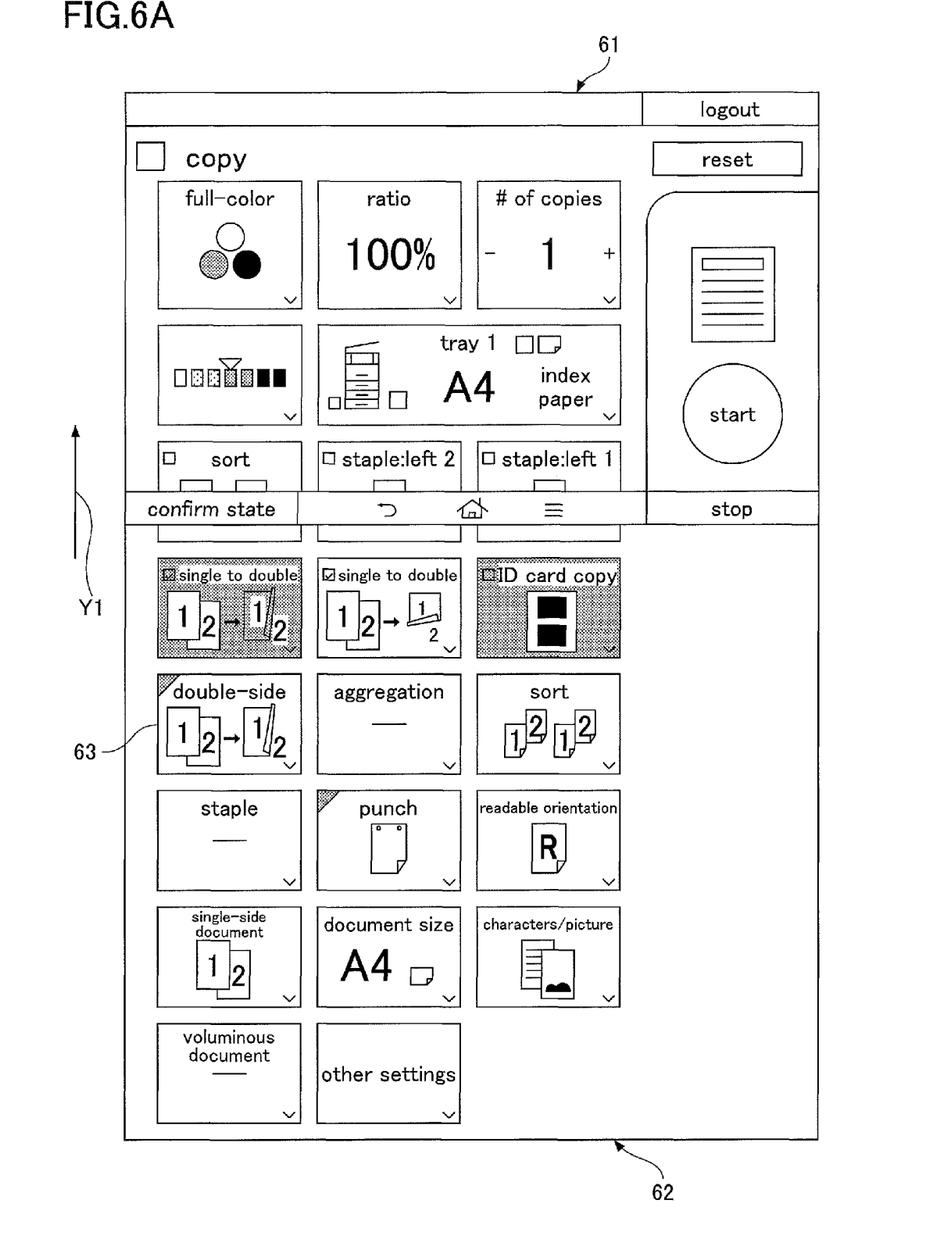
FIGS. 6A-6D are diagrams illustrating an example of transition of screens on an operation panel of an operational unit.
Figure 6B:
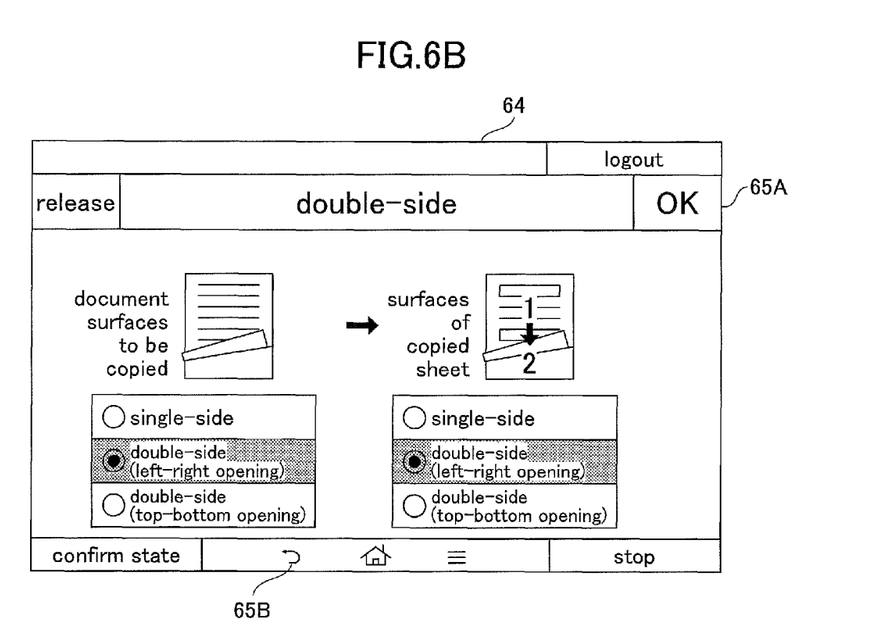
Figure 6C:
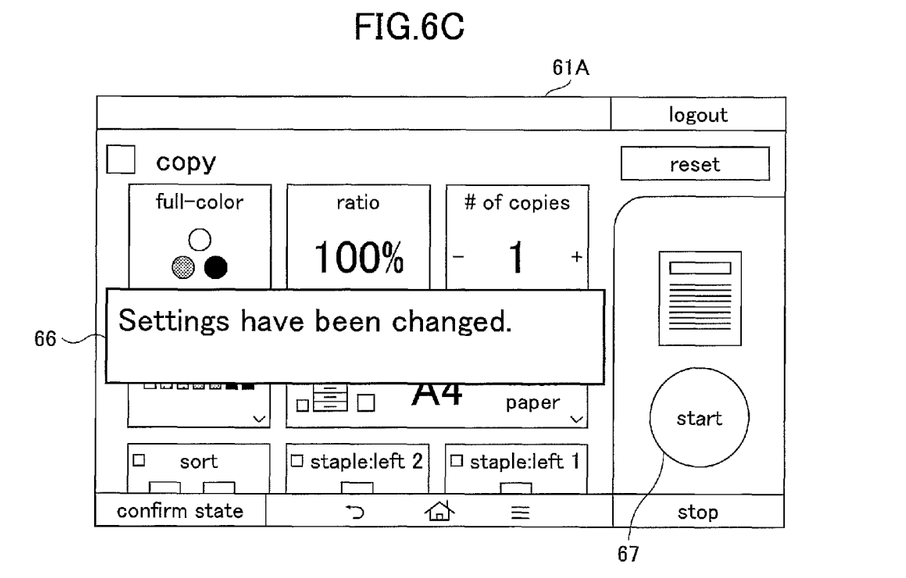
Figure 6D:
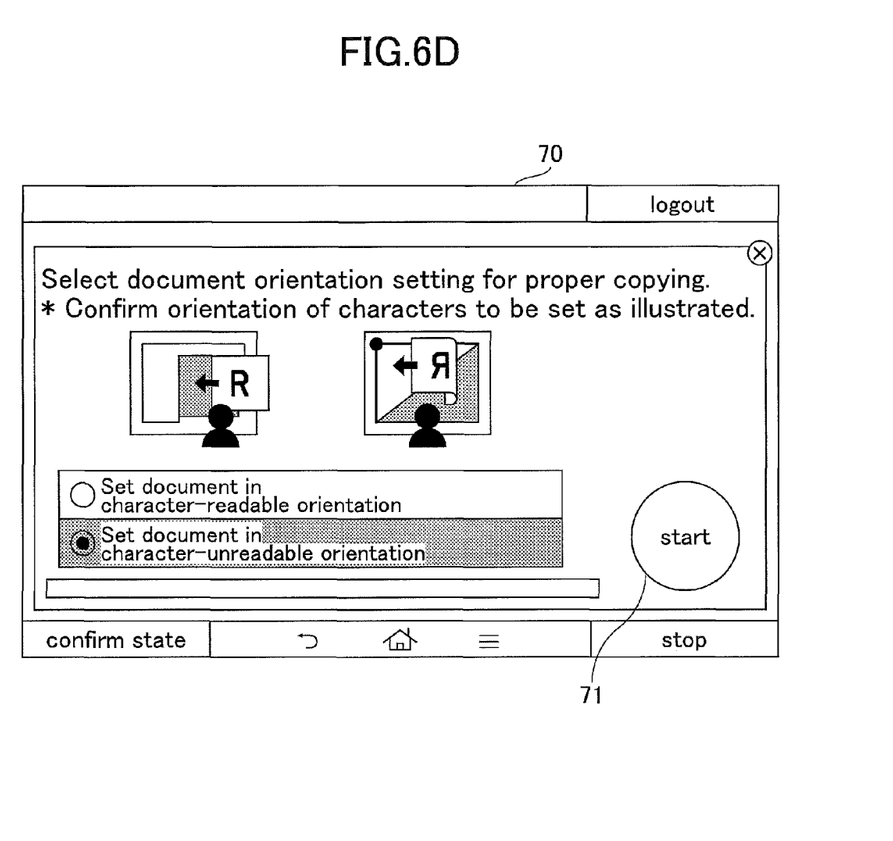

FIGS. 6A-6D are diagrams illustrating an example of transition of screens on the operation panel 205 of the operational unit 200. FIG. 6A illustrates an example of a top screen of a copy process displayed on the operational panel 205, and FIG. 6B illustrates an example of a setting screen for a double-side print process. FIG. 6C illustrates an example of a top screen after a setting has been done for the double-side print process, and FIG. 6D illustrates an example of a confirmation screen.

A top screen 61 in FIG. 6A is an example of a screen that is displayed on the operational panel 205 at Step S501 in FIG. 5. On the top screen 61 in FIG. 6A, the user may scroll an image 62 displayed on the top screen 61 in a direction designated by an arrow Y1, to have a display part 63 displayed on the operational panel 205, for selecting a double-side print process.

In response to receiving an operation on the display part 63 on the top screen 61, the display on the operational panel 205 transitions from the top screen 61 to a setting screen 64 of the double-side print process illustrated in FIG. 6B. Note that "receiving an operation" in the embodiment may be, for example, receiving a touch on the display part 63.

If a setting has been done for the double-side print process on the setting screen 64, and an OK button 65A is operated that indicates completion of the setting, the display on the operational panel 205 transitions from the setting screen 64 to a top screen 61A illustrated in FIG. 6C.

Note that if the user operates on a return button 65B on the setting screen 64 to return to the top screen 61, the display on the operational panel 205 transitions from the setting screen 64 to the top screen 61 illustrated in FIG. 6A.

On the top screen 61A illustrated in FIG. 6C, a message 66 indicating that the setting(s) has been done for the double-side print process is displayed. Note that information about a message to be displayed on the top screen 61A may be associated with a corresponding process, and stored in a storage device of the operational unit 200, for example, the ROM 202, the RAM 203, or the flash memory 204.

If the user operates on a start button 67 on the top screen 61A, the display control process unit 240 determines that an execution command has been issued for the double-side print process. Then, the display control process unit 240 has the operational panel 205 display a confirmation screen 70 for the orientation of the document as illustrated in FIG. 6D.

The confirmation screen 70 illustrated in FIG. 6D is an example of a screen displayed at Step S504 in FIG. 5. Note that in the embodiment, the confirmation screen 70 may be displayed superimposed on the top screen 61A (for example, pop-up displaying), or the display on the operational panel 205 may transition from the top screen 61A to the confirmation screen 70.

On the confirmation screen 70, if the user operates on a start button 71, the display control process unit 240 determines that confirmation of the orientation of the document has been completed, and an execution command has been issued for the double-side print process.

Figure 7:
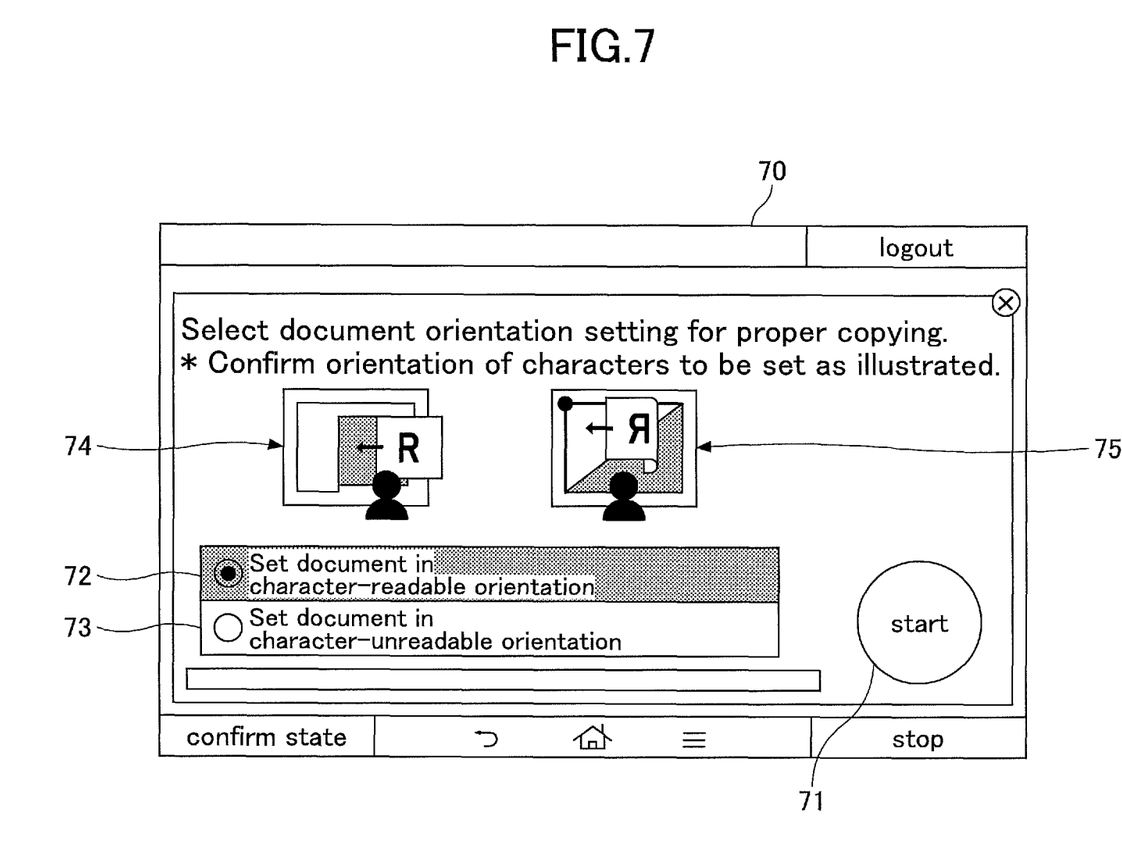
FIG. 7 is a diagram illustrating an example of a confirmation screen.

Here, the confirmation screen 70 in the embodiment will be further described with reference to FIG. 7. FIG. 7 is a diagram illustrating an example of the confirmation screen 70.

The confirmation screen 70 in the embodiment designates an orientation of the document that matches the currently selected process, to prompt the user to confirm whether the document is set in the orientation matching the process.

On the confirmation screen 70, messages 72-73 and images 74-75 that designate orientations of the document are displayed.

The image 74 is an image that illustrates a state in which the document is set, for example, on an ADF. In this case, the document is set so that a side having characters printed is oriented upwards (faceup), and hence, the user in front of the image processing apparatus 100 can read characters normally in this state. The message 72 corresponds to the image 74.

The image 75 is an image that illustrates a state in which the document is set, for example, on a contact glass. In this case, the document is set so that a side having characters printed is oriented downwards (facedown), and hence, the user in front of the image processing apparatus 100 cannot read characters normally in this state. The message 73 corresponds to the image 75.

In the example in FIG. 7, the message 72 is highlighted to indicate that the orientation of the document matching the selected process is the same as the orientation designated by the message 72 (in the state illustrated by the image 74). In other words, if following the confirmation screen 70 in FIG. 7, and setting the document in the character-readable orientation for the selected process, the user who has selected the process can obtain output as intended.

Figure 8:
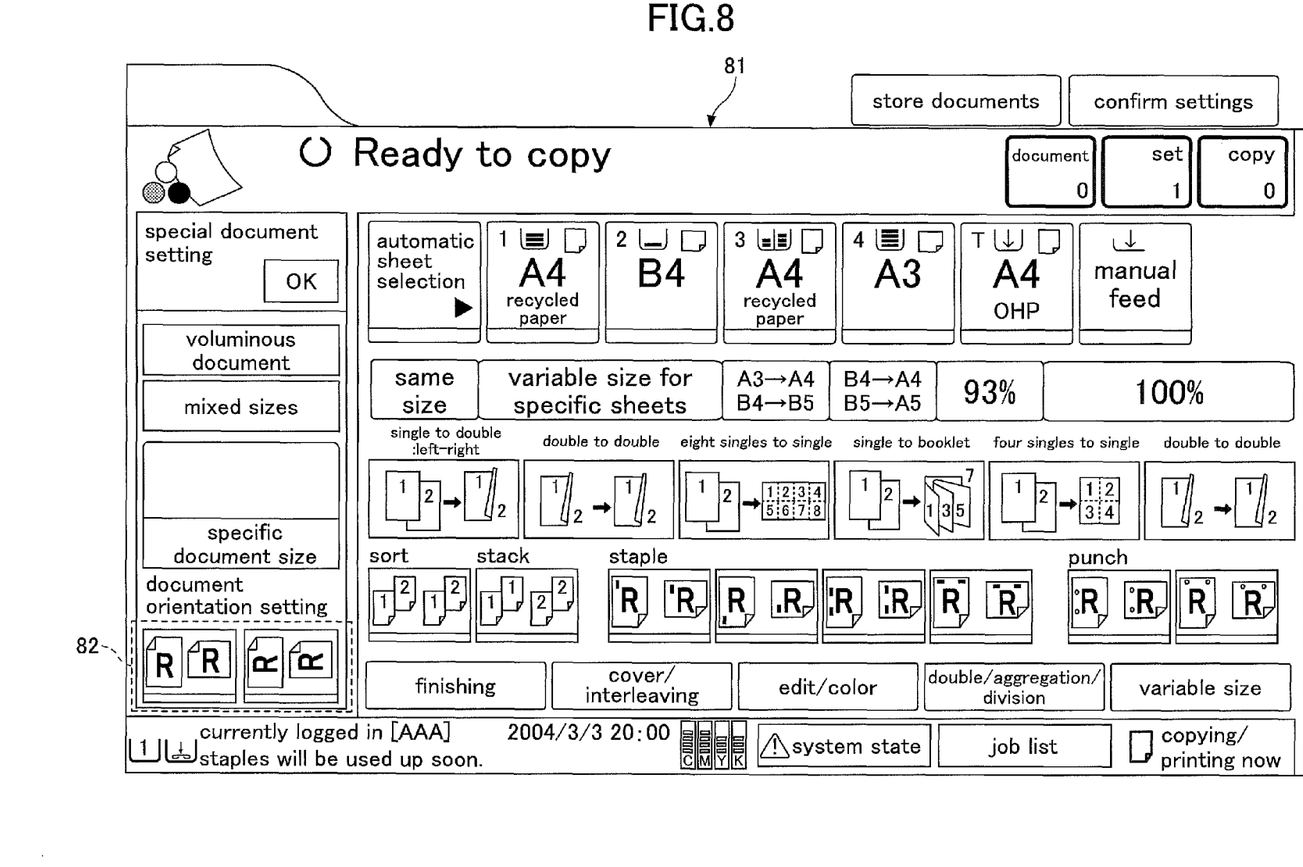
FIG. 8 is a diagram illustrating effects of an embodiment.

In the following, effects of the embodiment will be described with reference to FIG. 8. FIG. 8 is a diagram illustrating effects of the embodiment. On a top screen 81 illustrated in FIG. 8, a display part 82 for specifying the orientation of a document is displayed.

If a process for which the orientation of a document needs to be set is selected on the image processing apparatus 100, the orientation of the document is specified with the display part 82, and the document is actually set in accordance with the specified orientation, orientation, then, the process can be executed on a print side as intended by the user. Note that setting a document means, for example, placing the document on an ADF or a contact glass.

In the embodiment, with or without the orientation of the document specified as above, once an execution command has been received for the process, it is possible to prompt the user to confirm whether the orientation of the document is set in an orientation in accordance with the corresponding process.

Therefore, according to the embodiment, if the user does not recognize that the orientation of a document needs to be set, and issues an execution command for a process, without having set an appropriate orientation of the document, it is possible by the confirmation screen 70 to prompt the user to confirm whether the orientation of the document set by the user matches the process selected by the user. Also, according to the embodiment, for example, if the user does not recognize that the orientation of a document needs to be set, it is possible to prevent a processed result not intended by the user from being output.

Thus, the embodiments have been described in detail in the present disclosure. Note that the present invention is not limited to the specific embodiments, which can be changed within the scope of the present invention, and can be appropriately defined depending on usage.

RELATED-ART DOCUMENTS

Patent Documents

[Patent Document 1] Japanese Laid-open Patent Publication No. 2014-97859

What is claimed is:

1. An image processing apparatus configured to be capable of executing a plurality of processes, and to execute a process selected among the processes, the image processing apparatus comprising:
a storage unit configured to store a list in which each of the processes is associated with a type of the process representing whether the process is to use information about an orientation of a document;
an objective process determination unit configured to determine whether the selected process to be executed is of the type to use the information about the orientation of the document, based on the list stored in the storage unit; and
a display control unit configured to display a confirmation screen on a display unit, for prompting to confirm the orientation of the document after having received an execution command for the process, in a case where the process has been determined as of the type to use the information about the orientation of the document, wherein the confirmation screen indicates a current orientation to the user, and displays a button to the user to confirm the indicated orientation.

2. The image processing apparatus according to claim 1, wherein the confirmation screen includes an image illustrating an orientation of characters in the document, and a message corresponding to the image.

3. The image processing apparatus according to claim 1, wherein in a case where after the execution command for the process has been received, and an execution command has been issued again on the confirmation screen, the image processing apparatus executes the process for which the execution command has been received.

4. An information processing apparatus configured to be capable of executing a plurality of processes, and to execute a process selected among the processes, the information processing apparatus comprising:
a storage unit configured to store a list in which each of the processes is associated with a type of the process representing whether the process is to use information about an orientation of a document;
an objective process determination unit configured to determine whether the selected process to be executed is of the type to use the information about the orientation of the document, based on the list stored in the storage unit; and
a display control unit configured to display a confirmation screen on a display unit for prompting to confirm the orientation of the document after having received an execution command for the process, in a case where the process has been determined as of the type to use the information about the orientation of the document, wherein the confirmation screen indicates a current orientation to the user, and displays a button to the user to confirm the indicated orientation.

5. The information processing apparatus according to claim 4, wherein the confirmation screen includes an image illustrating an orientation of characters in the document, and a message corresponding to the image.

6. The information processing apparatus according to claim 4, wherein in a case where after the execution command for the process has been received, and an execution command has been issued again on the confirmation screen, the information processing apparatus executes the process for which the execution command has been received.

7. A non-transitory computer-readable recording medium having a program stored therein for causing a computer to execute a method, the computer being configured to be capable of executing a plurality of processes, and to execute a process selected among the processes, the method comprising:
   referring to a storage unit configured to store a list in which each of the processes is associated with a type of the process representing whether the process is to use information about an orientation of a document;
   determining whether the selected process to be executed is of the type to use the information about the orientation of the document, based on the list stored in the storage unit; and
   displaying a confirmation screen on a display unit for prompting to confirm the orientation of the document after having received an execution command for the process, in a case where the process has been determined as of the type to use the information about the orientation of the document, wherein the confirmation screen indicates a current orientation to the user, and displays a button to the user to confirm the indicated orientation.

8. The non-transitory computer-readable recording medium according to claim 7, wherein the confirmation screen includes an image illustrating an orientation of characters in the document, and a message corresponding to the image.

9. The non-transitory computer-readable recording medium according to claim 7, wherein in a case where after the execution command for the process has been received, and an execution command has been issued again on the confirmation screen, the computer executes the process for which the execution command has been received.

* * * * *